Nov. 23, 1948.       F. G. YANES       2,454,729
METHOD OF MOLDING HALF-TONE VALUES
IN PRINTING SURFACES
Filed Sept. 27, 1945

INVENTOR.

UNITED STATES PATENT OFFICE 2,454,729

METHOD OF MOLDING HALFTONE VALUES IN PRINTING SURFACES

Francisco G. Yanes, New York, N. Y.; Anne F. Goddard executrix of said Francisco G. Yanes, deceased Application September 27, 1945, Serial No. 618,951

9 Claims. (Cl. 101—401.2)

The invention relates in general to improvements in method of molding half-tone values in printing and includes means, ways, and products. In the present disclosure it specifically concerns the production of half-tone plates.

Although the invention may find application in different arts it was originated in an effort to eliminate difficulties encountered in the rapid duplication of photoreliefs.

According to the invention a photorelief including a plastic support and values represented by residual amounts of sensitive matter can be transformed into an all-plastics relief surface without resorting to moulding and casting.

During the investigation of this problem it was found that instead of taking a mould and a cast, reversed relief values can be photographically produced or transferred upon and in perfect contact with the very material to be stamped, which thus becomes the support of the photorelief. In this manner the shaping values are like a mould without a bottom, positioned at the right place, and susceptible of being incrusted by pressure into the plastics with advantage and simplification. The inlaid values may then be removed leaving a photo-formation in the plastic material.

While examining the possibility of applying the same treatment to those photoreliefs in which the support has a special shape, the plastics to be stamped was pre-formed and given the shape of a "tint plate"; some values of negative character were produced thereon; and the whole was submitted to the same pressing operation until values and plastics presented the appearance of an even surface. After the flattened values were removed a positive and printable photorelief was found all in plastics. The same test was made with a number of photoreliefs produced on supports having different relief patterns, and the results were equally satisfactory.

Other experimenting showed that the flattening of a photorelief is susceptible of furnishing surfaces for different kinds of printing systems by creating permeable and impermeable areas when the inlaid values instead of being removed are left in the plastics.

It is worth noting that while the flattening of a photorelief, until the values are inlaid into the plastics, is substantially the same in all cases, there is a difference in the performance of the stamped material when it is even or when it is pre-formed with a relief pattern. In the first case the plastics are, so to say, passive, and receive the impression of the values—which are strongly baked by the pressing means—as they would from a moulding die which, in this instance, is conveniently without a bottom. This is evident from the fact that the pressing furnishes a surface which is equivalent to a counter-replica of the original photorelief. But when the plastics have been pre-formed its performance is active, for the structure cooperates in the results. It seems that the flattening of the minute elevations of a tint plate develops sideways and finds a selective resistance in the surrounding values which are not backed laterally by the pressing means. Such resistance is proportional to their mass, as if these values were a sort of selectively yielding moulding means. The interesting result is that the photographic values in the gelatine are reversed and transformed into photomechanical values in the plastics by the action of pressure upon the pre-formed structure. The final plate in this case is not a counter-replica of the original photorelief, and yet it is printable as a half-tone block.

Reference will be made in the disclosure to several uses of the invention in the field of graphic arts of which two are specially illustrated as typical examples. The first, is the flattening of a photorelief when the plastic support is even; the second, when the support of the photorelief has been pre-formed.

In both examples of the figures the initial photorelief is submitted to substantially the same pressing operation. The flattening takes place against a surface which may be curved to fit some kinds of printing systems. There are many natural, synthetic, or mixed substances sucseptible of being formed under suitable conditions which will do for the support; but I prefer in most cases thermoplastic resins which are transparent and can be made hard or soft at will by changes in the working temperature. For certain applications thermosetting plastics are desirable. The relief values may be conveniently produced photographically from a transparent design or a photographic record. Many known substances can be mixed with sensitizers and will furnish the desired coating. Gelatine is most suitable, as naturally tough and susceptible of being hardened. But other known substances and mixtures with similar properties may be successfully used in the same manner. For producing the values several methods may be followed which are mostly based on the hardening action of light upon varied chromated mixtures, or in the selective elimination of a coating carrying a silver image through convenient treatments, etc. As to the production of the values on the support I may follow the suggestion of Namias by coating the support with the sensitive mixture before the exposure, or I may separately obtain a carbon-tissue like image and then transfer and develop the relief values on the support in the manner taught by Waterhouse. In either case a perfect contact is secured.

The pressing is preferably made against a chrome faced steel surface under a temperature which depends upon the plastics adopted and which must be established by test. The point is to prevent running of the plastics and distortion of the values. I may secure the adhesion of the last to the support by means of a substratum and thoroughly harden the residual coating with adequate treatments.

As to mechanical devices for flattening the photoreliefs a hydraulic press is most suitable, although many other pressing contrivances may be used.

When the flattening operation is performed the printing surface may be considered as finished, for the inlaid values can be easily removed and may be left temporarily in place as an excellent packing preserving the plate from injury until it is needed for use. The gelatine inlaid in the plastics may be cleaned away by brushing, but it is preferable to prevent scratches by immersing the plate in a lukewarm solution of potash where the stripping takes place in very few minutes. After a brief rinsing in water the plate is dried with a cloth and ready for printing.

Figure 1:
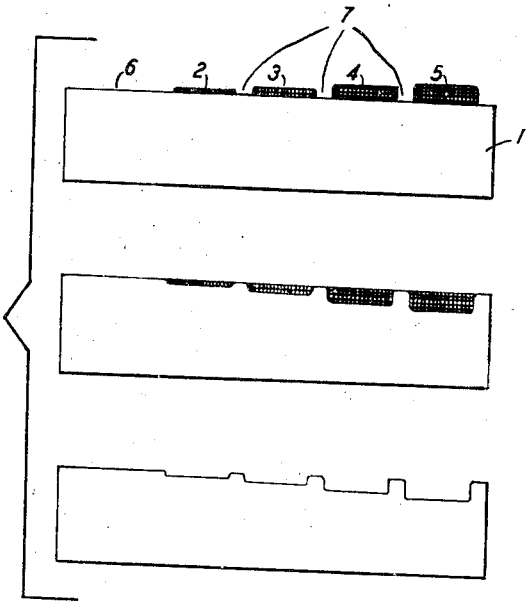
Fig. 1 shows in three stages a photorelief with an even support of plastics in which the additional values are first inlaid and then eliminated.

The three stages of Figure 1, represent the general case when the values of the photorelief to be transformed are held by an even support. In the specific example of the figure, a screened intaglio plate is produced. I first make the photorelief illustrated in the first stage, which consists of an even support of sheet plastics 1, upon which 2, 3, 4, 5, represent photographic values in relief, the whites corresponding to a substantially bare section 6. The values are separated by empty spaces 7, indicating the lines of a gravure screen. Such screen is interposed during the exposure and for contact printing it may be conveniently recorded on the negative from which the photorelief is made. The photographic values in this case although having a positive character, are reverse relief values, for they develop when inlaid the cavities which are utilized in intaglio printing. After the photorelief is completed, through known photographic operations, I submit it to the flattening step illustrated in the second stage. The final plate, after the values are stripped is shown in the third stage. In this simple manner and without departing from the general technique formerly outlined I may produce a pseudo photogravure plate from a continuous tone negative, or an engraved like die from a line drawing record.

Relief surfaces for typographic printing as line and half-tone plates from process negatives can also be produced by following the same steps illustrated in Figure 1. The photorelief on the even support may be obtained by known means, only that the photographic values must be of negative character.

Relief plates for varied printing, embossing, and other industrial purposes can be obtained also through the three stages of Figure 1. It may be added that by omitting the step of the third stage thus leaving the permeable values inlaid in the support, it is possible to produce plates for other systems of printing utilizing flat surfaces, as imbibition, pigment discharge, lithography, etc., with the advantage that the evenness of the printing surface facilitates the contact.

Figure 2:
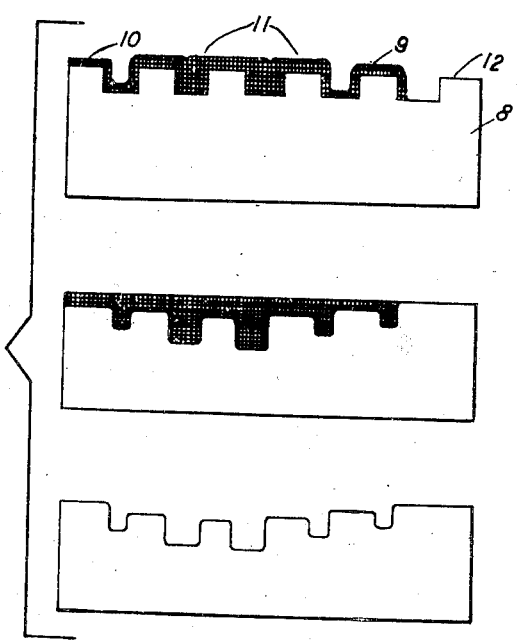
Fig. 2 illustrates in three stages a similar photorelief having a pre-formed support carrying values which are inlaid first and then removed from the plastics.

Still the most interesting application of the new method is illustrated in Figure 2. It concerns the results of the flattening step when the support of the photorelief has been pre-formed and values, residual of a sensitive coating, are selectively distributed thereon. It is interesting because photoreliefs of that kind may be produced which give an excellent performance as half-tone plates, and their transformation into an all-plastics printing plate finishes a better product for practical purposes. For that reason this specific variation has been chosen for demonstrating the invention.

The body shown in the first stage of Figure 2, is a photorelief produced upon a pre-formed plastic base. The support is a fundamental highlight tint plate 8, provided with projections which furnish the conventional whites 12, wherever bare; other values at selected sections appearing in the form of additional matter 9, 10, 11. These values are of negative character as the flattening step produces a reversal.

The results of the pressing operation is illustrated in the second stage of Figure 2. The element has been flattened and the values inlaid into the plastics until the surface of the photorelief is substantially even. At the same time some of the high-light dots have increased in printing area reversely to the values 9, 10, 11, while the whites 12, are changed into full shadows. The inner plastic structure, however, is not a counter-replica of the photorelief of the first stage which would not cast it. It seems that in the reaccommodation of matter which takes place, those high-light projections fully surrounded by the hardened colloid remain unchanged, while others, in which the protection of the surrounding values is a lesser one are diversely flattened as the lateral resistance of the values yields in reverse proportion to their mass, and so the originally high-light projections become correspondingly transformed into half-tone and shadow printing values.

The result achieved in the second stage of Figure 2, evidently shows a useful novelty in the technique of forming. The relief values of the first stage having different thicknesses constitute yielding moulding means which give way more or less in a lateral direction and as highlight projections pre-formed in a plastic body can be flattened by pressure against an even surface and their printing tops increased in area by a lateral displacement of matter, it is evident that said yielding moulding means selectively distributed around said projections—in the example photographic relief values—will modify the extension of the flattening proportionally to the resistance they oppose. In other words, by flattening the kind of photorelief illustrated in the first stage of Figure 2, the pressure transforms negative photographic values of gelatine into positive photomechanical values of plastics.

The means illustrated in the first stage of Figure 2, include the plastic support 8, provided on one side with minute elevations capable of printing small dots. These dots may preferably correspond to a high-light tint, but squares, lines, or other graphic elements susceptible of printing a light-tone effect may also be utilized for those half-tone plates of lithographic appearance in which the whites are pure. The elevated pattern in the support may include plural elevated textures at different planes as suggested in my patent application Serial No. 531,566, dated April 18, 1944, now Patent No. 2,441,609. The important question is that the minute elevations create between them empty spaces where a varied and selective resistance can be accommodated. These are represented in the figure by the relief values 9, 10, 11, which are suitably distributed upon and around the projections. Such values are of negative character and photographically produced, as the most accurate and easy way of creating a proportional lateral resistance to the flattening effect. For values including gelatine and similar substances it is indispensable that the relief values be thoroughly hardened and made resistant to moulding temperatures with formaldehyde or equivalent treatment.

The first stage of Figure 2, must be considered either as a pre-formed support holding relief values, or relief values filled with a support, such values being a shell, residual of a sensitive coating, showing on one side moulding cavities of uniform shape filled with plastics, and on the other side relief values diversely reinforcing the walls and moulding resistance of said cavities. A shell of this kind may be separately produced and when filled with pulverized plastics will render, after the flattening operation, the same result shown in the second stage of the figure. It constitutes the yielding moulding means of the invention.

The simplest way of operating is to coat a pre-formed transparent support of thermoplastic resin with the sensitive matter, expose the plate so formed through the base under a positive transparency of the subject, and then processing it into a photo-relief. When using chromated mixtures it is convenient to add a pigment for judging the extent of the exposure and the presence of detail in the lighter sections corresponding to the shadows to be. As to the thickness of the coating it is favorable that the projections be covered though not to excess. There is certain latitude in the general thickness of the values or what may be called the density of the relief because the contrast can be maintained within certain limits; but an excess of coating if retained by the exposure would under pressure sink the high-lights and lighter tones beyond an operative printing plane. Such effect may be desired, however, for obtaining pure whites.

In the production of the photorelief I may use some of the elements I have suggested in issued and pending patents of my own in which a transparent and pre-formed sheet of plastics carrying a sensitive coating is exposed through the support and processed into a printable half-tone plate. This is convenient because the resulting photorelief will show elevated projections of sufficient depth and values of the kind required in the means illustrated in the first stage of Figure 2. But such possibility is not indispensable for demonstrating the present invention, as the relief values may be suitably distributed among projections incapable of transforming by the effect of light photographic values into photomechanical ones, and still the flattening step of the invention will produce the reversal and transformation of the values. Which means that regardless of the fact that the last photorelief would be unprintable, the pressing step of the invention will make it so, the operative result showing that we are in the presence of a true combination.

The versatile ways of the invention as formerly described include the flattening of the photorelief until the values are inlaid into the support and, subsequently, the stripping from the plastics of the matter forming said values.

As to the product illustrated in the third stage of Figure 2, it may present different qualities which are controllable when creating the means of the first stage, or could be modified before or during the mounting of the plate. For instance, it is feasible to add an extra thickness to the photorelief during the pressing operation by backing sheets of plastics or other moldable matter which becomes adhered when heat and pressure are applied. This permits the use of a thin support in the photorelief for better definition, while providing a final plate of suitable body and strength.

It may be observed that the all-plastics half-tone plate of the third stage in Figure 2, has not the different values at the same plane, the high-lights being the lowest and the shadows the highest. This is a great advantage for newspaper work, for the half-tone block has already a "bump" which is gradually developed and enhances the printing contrast not only between high-lights and tones but among all the values. The prints furnished by this type of half-tone on newsprint are excellent.

When the all-plastic half-tone is to be printed on glossy or similar hard-papers, the values may be brought near the same plane in different ways, as by cutting down the thickness of the coating to a minimum; by conveniently shortening the development of the transparencies; by mounting the plates with a known "pressure sensitive" cement; or by following some suggestions found in the early art for raising the values in projections of pyramidal shape which were selectively wore down for producing a printing design, etc. In fact, some plastics printing surfaces are so "transparent to form" that when mounted on wood without suitable precautions the veins of the wooden block show in the print. The real concern is rather to prevent that the "bump" when needed should sink and be lost into the mount. This is achieved by interposing a thin sheet of metal or other rigid matter between the plastics and wood which has not been previously evened up with some hard substance. When the plate is made of a thermosetting tough resin such precautions are unnecessary.

The product of the invention is easily recognized before the inlaid values are removed. It can be identified also after the stripping of the values by several characteristics created by the process. Typical vestiges of a substratum may show that a photorelief was formed by its own values; or the absence of corrosion marks that the surface is not a duplicate of an etched plate, etc. Among such characteristics there are some involving useful novelty of the product. As there is no etching the elevated sections are never undercut in any extent and the product can be directly moulded by electro-deposition without fear of finding difficulties in the separation of the shell; or by other usual processes without breaking the wax of the case or the paper in the mat. The gradual difference of height among all the values, is another improvement upon the known equal "bump" of the values over the high-lights. I have formerly obtained in a previous invention a similar product when developing a mould by etching under a continuous tone resist pre-formed cavities; but the cast taken therefrom presents corroded printing areas lacking the even and polished surface of the values in the new product which so contributes to the striking brilliancy of the print.

Through the above description all the pertinent information has been directed to the specific example adopted for demonstrating the invention, with the purpose of simplifying the practice of the achievement as disclosed. This, however, does not involve in any way a limitation as to the many equivalent forms of producing a surface by a general flattening action in one direction and a varied and selective resistance in a lateral direction upon minute elevations preformed in a body. Nor the fact that the lateral resistance may be conveniently produced by photographic values exclude the possibilitity of producing and distributing other kinds or forms of resistance between the projections. In regard to matter, the choice of substances which can be successively made soft and hard through changes of temperature for immediate printing purposes, does not deny the convenience of using more economical materials that can be hardened by after-treatments, or provided with a reinforcement of surface, or utilized in other ways even as a master structure for further duplication. As to certain suggestions emphasized when producing values of gelatine obviously do not apply to all the substances which can be used as substitutes and may not require identical treatment. Etc.

In conclusion, I have presented and illustrated to the best of my knowledge all of the features and applications of the invention in the endeavor of making a disclosure as complete as possible. It is evident, however, that many accessory and secondary details may have been omitted and that variations and equivalents may be developed without departing from the scope of the achievement. Accordingly, it is to be understood that I reserve myself the privilege of resorting to all such legitimate applications and adaptations as may be fairly comprehended within the wording and spirit and of the following claims.

I claim:

1. Method of forming a surface, which consists in first, producing on a thickness of matter susceptible of being shaped by pressure a superficial elevation of equally distributed and similar minute projections; second, selectively arranging upon and around said projections different amounts of a second matter variedly reinforcing their resistance to pressure; third, flattening the whole until it shows a substantially even face; and fourth, removing the second matter.

2. Method of making a relief which consists in first preforming on a thickness of thermoplastic matter a graphic texture showing uniform and equally arranged minute elevations; second, covering and filling said elevation and the spaces between with a selectively varying thickness of a second matter moldable under pressure; third, applying heat and pressure to said second matter while in contact with an even surface until the two substances are incorporated and flattened; and fourth, removing the second matter when cold.

3. Method of making a half-tone relief which consists in first pre-forming on a support of transparent thermoplastic substance an elevated pattern of minute projections capable of printing a light tint; second, coating said support with matter sensitive to light; third, exposing the sensitive coating through the support under a positive transparency; fourth, processing the exposed element into a photorelief; fifth, thoroughly hardening the values; sixth, flattening the surface of the resulting photorelief under heat and pressure until the values become inlaid into the plastics; and seventh, removing the inlaid values.

4. Method of transforming a thickness of plastic matter showing a number of small elevations of uniform structure, into a relief having elevations of varied areas, which consists in flattening the thickness of plastic matter under two forces, one over the complete area in the direction of the flattening action, and the other against the displacement of matter which is developed by the flattening in lateral direction, said two forces respectively represented by pressing means acting upon the plastic and resisting means laterally and variedly reinforcing the small projections.

5. The method of producing different printing values in parts of the printing area of a plastic printing element defined by substantially uniformly distributed surface projections of substantially the same dimensions; which comprises superimposing upon and between selected projections in said printing area a moldable material of relatively low plasticity, having portions of relatively different thickness overlying certain of said selected projections, then heating said element and simultaneously molding said material under pressure upon and around said selected projections to cause said material to exert differential pressure forces upon said projections and variably alter the dimensions thereof.

6. A method as defined in claim 5, in which said printing element is a transparent material and wherein said moldable material is a hardened light-sensitive composition.

7. In a method of producing printing values in the printing area of a plastic intaglio printing element having substantially uniformly distributed superficial projections and depressions of uniform shape and dimension; the step which comprises selectively applying different pressure forces to selected projections of said element to variably alter the dimensions thereof and establish the printing values of said depressions in accordance with a predetermined design.

8. The method step as defined in claim 7, wherein the pressure forces are simultaneously applied to the individual projections in the plane of the printing element and in a direction substantially normal to said plane.

9. The method of making a photo-relief printing element, which comprises first superimposing upon a surface of a thermoplastic transparent element having an elevated pattern of minute projections thereon, a heat resistant photo-relief; then hardening the relief values, then heating said element and simultaneously applying and transmitting pressure forces through the photo-relief to the projections of the thermoplastic element to alter the dimensions of said projections and mold the relief values into said element, and finally removing the substance of said photo-relief values.

F. G. YANES.

REFERENCES CITED

The following references are of record in the file of this patent:

UNITED STATES PATENTS

| Number | Name | Date |
|---|---|---|
| 1,811,971 | Sauer | June 30, 1931 |
| 2,078,535 | Hagedorn | Apr. 27, 1937 |
| 2,234,997 | Yanes | Mar. 18, 1941 |
| 2,323,752 | Howey | July 6, 1943 |

Certificate of Correction

Patent No. 2,454,729.  November 23, 1948.

FRANCISCO G. YANES

It is hereby certified that errors appear in the printed specification of the above numbered patent requiring correction as follows:

Column 1, line 3, after the word "printing" insert *surfaces*; column 4, line 8, for "finishes" read *furnishes*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*